United States Patent
Zheng et al.

(10) Patent No.: US 10,476,697 B2
(45) Date of Patent: Nov. 12, 2019

(54) NETWORK-ON-CHIP, DATA TRANSMISSION METHOD, AND FIRST SWITCHING NODE

(71) Applicant: HUAWEI TECHNOLOGIES CO., LTD., Shenzhen (CN)

(72) Inventors: Qiaoshi Zheng, Shenzhen (CN); Zhirui Chen, Shenzhen (CN); Jing Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/890,856

(22) Filed: Feb. 7, 2018

(65) Prior Publication Data
US 2018/0227146 A1 Aug. 9, 2018

(30) Foreign Application Priority Data
Feb. 7, 2017 (CN) .......................... 2017 1 0067251

(51) Int. Cl.
*H04L 12/42* (2006.01)
*H04L 12/933* (2013.01)
*H04L 12/64* (2006.01)

(52) U.S. Cl.
CPC .......... *H04L 12/42* (2013.01); *H04L 12/6418* (2013.01); *H04L 49/109* (2013.01); *H04L 2012/421* (2013.01); *H04L 2012/6437* (2013.01)

(58) Field of Classification Search
CPC ... H04L 12/42; H04L 12/6418; H04L 49/109; H04L 2012/421; H04L 2012/6437
IPC ......................................... H04L 12/42,12/6418
See application file for complete search history.

(56) References Cited

U.S. PATENT DOCUMENTS

| | | | |
|---|---|---|---|
| 8,693,319 B2 | 4/2014 | Chou et al. | |
| 2014/0050224 A1 | 2/2014 | Kauschke et al. | |
| 2014/0052923 A1* | 2/2014 | Ikeda | G06F 12/084 711/130 |
| 2014/0334818 A1* | 11/2014 | Mehrvar | H04Q 11/0066 398/51 |
| 2016/0112780 A1* | 4/2016 | Zhang | H04Q 11/0066 398/45 |
| 2016/0134482 A1* | 5/2016 | Beshai | H04L 49/1584 370/254 |

* cited by examiner

*Primary Examiner* — Ivan O Latorre
(74) *Attorney, Agent, or Firm* — Conley Rose, P.C.

(57) ABSTRACT

A network-on-chip and a corresponding method are provided. The network-on-chip includes at least one bufferless ring network in at least one dimension of the network-on-chip. At least one bufferless ring network includes multiple routing nodes, and at least one of the multiple routing nodes is a switching node. Two bufferless ring networks in different dimensions may intersect. The two bufferless ring networks exchange data by using switching nodes. A dedicated slot and a public slot are configured in each bufferless ring network. Only one switching node has permission to use a dedicated slot at a same moment in each bufferless ring network, the permission to use the dedicated slot is transferred successively between switching nodes in each bufferless ring network. The permission to use the dedicated slot is transferred after transmission of data in the dedicated slot is completed.

19 Claims, 7 Drawing Sheets

---

A first switching node determines whether the first switching node has permission to use a dedicated slot of a first bufferless ring network in which the first switching node is located — S201

↓

The first switching node determines whether the dedicated slot arrives at the first switching node — S202

↓

When the first switching node has the permission to use a dedicated slot, and the dedicated slot arrives at the first switching node, the first switching node uses the dedicated slot to transmit data — S203

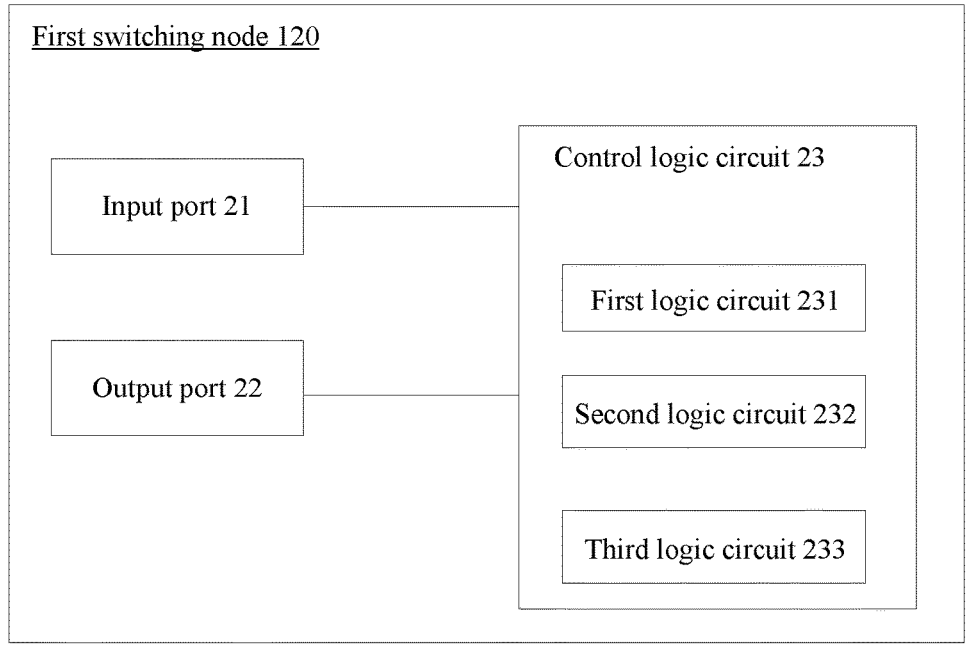

FIG. 6

| S201: A first switching node determines whether the first switching node has permission to use a dedicated slot of a first bufferless ring network in which the first switching node is located |
| S202: The first switching node determines whether the dedicated slot arrives at the first switching node |
| S203: When the first switching node has the permission to use a dedicated slot, and the dedicated slot arrives at the first switching node, the first switching node uses the dedicated slot to transmit data |

FIG. 7

NETWORK-ON-CHIP, DATA TRANSMISSION METHOD, AND FIRST SWITCHING NODE

CROSS-REFERENCE TO RELATED APPLICATION

This application claims priority to Chinese Patent Application No. 201710067251.5, filed on Feb. 7, 2017, which is hereby incorporated by reference in its entirety.

TECHNICAL FIELD

This application relates to the field of network-on-chip (NoC) technologies, and in particular, to a network-on-chip, a data transmission method, and a first switching node in data communication networks.

BACKGROUND

NoC is a new on-chip communications architecture designed for a multi-core system on chip (SoC). According to an arrangement dimension of nodes in a NoC, the NoC may be classified into a one-dimensional NoC, a two-dimensional NoC, a three-dimensional NoC, and the like.

A two-dimensional NoC is used as an example. The two-dimensional NoC includes two dimensions, which are recorded as a horizontal direction and a vertical direction. At least one bufferless ring network may be included in each dimension, each bufferless ring network includes multiple routing nodes, the multiple routing nodes are connected in series into a ring shape, and each routing node is configured to be connected to at least one function module. A horizontal bufferless ring network intersects with a vertical bufferless ring network, and the two bufferless ring networks that intersect exchange data by using two connected routing nodes. The two connected routing nodes are also referred to as switching nodes. A number of switching nodes included in each bufferless ring network is corresponding to a number of bufferless ring networks that intersect with the bufferless ring network.

In a NoC, each bufferless ring network performs data transmission by using a timeslot, which may also be referred as a slot. A slot is a carrier that carries data. For a bufferless ring network, a number of slots is equal to a number of routing nodes in the bufferless ring network. A slot is transferred between the routing nodes in the bufferless ring network according to a predetermined direction, and there is only one slot at each routing node at each moment in the bufferless ring network. When data is transmitted between the routing nodes by using a slot, a routing node may transmit data in a function module to a slot, may transmit data in a slot to a function module, or may transfer, by using connected switching nodes, data in a slot of a bufferless ring network to a slot of another bufferless ring network for transmission, so as to implement a data exchange between two bufferless ring networks.

When all data in all slots of a horizontal bufferless ring network in two bufferless ring networks that intersect needs to be transmitted to a vertical bufferless ring network, and all data in all slots of the vertical bufferless ring network needs to be transmitted to the horizontal bufferless ring network, when all the slots of the two bufferless ring networks are loaded with data, a slot at a switching node that is connected to another switching node is loaded with data, regardless of how the slot is transferred. Therefore, the switching node cannot transmit the data in the slot to another bufferless ring network, data cannot be exchanged between the two bufferless ring networks, and a network deadlock is formed.

SUMMARY

To resolve a problem in the prior art that when all slots are loaded with data, data cannot be exchanged between two bufferless ring networks that intersect and a deadlock is caused, embodiments of the present disclosure provide a network-on-chip, a data transmission method, and a first switching node. The technical solutions are as follows.

According to a first aspect, the present disclosure provides network-on-chip. The network-on-chip includes a two-dimensional network-on-chip, where at least one dimension of the network-on-chip comprises at least one bufferless ring network, the at least one bufferless ring network comprises multiple routing nodes connected in series into a ring shape, and at least one of the multiple routing nodes is a switching node. The network-on-chip includes a first bufferless ring network and a second bufferless ring network that intersect in the network-on-chip, the first bufferless ring network and the second bufferless ring network are in different dimensions, the first bufferless ring network comprises a first switching node, the second bufferless ring network comprises a second switching node, and the first switching node and the second switching node are connected to each other to exchange data. Each bufferless ring network comprises N slots configured to carry data, each bufferless ring network further comprises N routing nodes in the bufferless ring network, each slot is cyclically transmitted in the bufferless ring network to which the slot belongs, and there is only one slot at a routing node at a same moment. The N slots comprise M dedicated slots and N–M public slots, M is a positive integer, N>M≥1, only one switching node has a permission to use a dedicated slot at a same moment in each bufferless ring network, the permission to use the dedicated slot is transferred successively between switching nodes in the bufferless ring network to which the dedicated slot belongs, and the permission to use the dedicated slot is transferred after transmission of data in the dedicated slot is completed. The first switching node is configured to: when the first switching node has permission to use a dedicated slot of the first bufferless ring network, the dedicated slot of the first bufferless ring network arrives at the first switching node, and the second switching node has data that needs to be transmitted to the first bufferless ring network, obtain the data of the second switching node, and use the dedicated slot of the first bufferless ring network to transmit the obtained data.

According to a second aspect, the present disclosure provides a data transmission method. In the method, by a first switching node determines whether the first switching node has a permission to use a dedicated slot of a first bufferless ring network in which the first switching node is located, where the first bufferless ring network comprises multiple routing nodes, the multiple routing nodes in the first bufferless ring network are connected in series into a ring shape, at least one of the multiple routing nodes in the first bufferless ring network is a switching node, and the at least one switching node comprises the first switching node; wherein the first bufferless ring network comprises N slots configured to carry data in the first bufferless ring network, the first bufferless ring network further comprises N routing nodes in the first bufferless ring network, each slot is cyclically transmitted in the first bufferless ring network, there is only one slot at a routing node at a same moment, the N slots comprise M dedicated slots and N–M public slots, M is a positive integer, and N>M≥1; and only one switching node has the permission to use the dedicated slot at a same moment in the first bufferless ring network, the permission to use the dedicated slot is transferred successively between switching nodes in the first bufferless ring network, and the permission to use the dedicated slot is transferred after transmission of data in the dedicated slot is completed. The first switching node determines whether the dedicated slot arrives at the first switching node. When the first switching node has the permission to use the dedicated slot of the first bufferless ring network, the dedicated slot of the first bufferless ring network arrives at the first switching node, and a second switching node that is in a second bufferless ring network and that is connected to the first switching node has data that needs to be transmitted to the first bufferless ring network, obtaining, by the first switching node, the data of the second switching node, and using the dedicated slot of the first bufferless ring network for transmission, wherein the first bufferless ring network and the second bufferless ring network intersect in a network-on-chip, and the first bufferless ring network and the second bufferless ring network are in different dimensions.

According to a third aspect, the present disclosure provides a first switching node. The first switching node includes a first determining circuit, a second determining circuit, and a processor. The first determining circuit is configured to determine whether the first switching node has permission to use a dedicated slot of a first bufferless ring network in which the first switching node is located, wherein the first bufferless ring network comprises multiple routing nodes, the multiple routing nodes in the first bufferless ring network are connected in series into a ring shape, at least one of the multiple routing nodes in the first bufferless ring network is a switching node, and the at least one switching node comprises the first switching node; N slots used for carrying data are configured in the first bufferless ring network, N is a number of the routing nodes in the first bufferless ring network, each slot is cyclically transmitted in the first bufferless ring network, there is only one slot at a routing node at a same moment, the N slots comprise M dedicated slots and N−M public slots, M is a positive integer, and N>M≥1; and only one switching node has the permission to use the dedicated slot at a same moment in the first bufferless ring network, the permission to use the dedicated slot is transferred successively between switching nodes in the first bufferless ring network, and the permission to use the dedicated slot is transferred after transmission of data in the dedicated slot is completed. The second determining circuit is configured to determine whether the dedicated slot arrives at the first switching node. The processor is configured to: when the first switching node has the permission to use the dedicated slot of the first bufferless ring network, the dedicated slot of the first bufferless ring network arrives at the first switching node, and a second switching node that is in a second bufferless ring network and that is connected to the first switching node has data that needs to be transmitted to the first bufferless ring network, obtain the data of the second switching node, and use the dedicated slot of the first bufferless ring network for transmission, wherein the first bufferless ring network and the second bufferless ring network are any two bufferless ring networks that intersect in a network-on-chip, and the first bufferless ring network and the second bufferless ring network are in different dimensions.

It should be understood that general descriptions above and detailed descriptions below are merely illustrative and explanatory without limiting the present disclosure.

BRIEF DESCRIPTION OF DRAWINGS

FIG. 6 is a schematic diagram of a hardware structure of a first switching node aspect to an embodiment of the present disclosure;

FIG. 7 is a flowchart of a data transmission method according to an aspect of the present disclosure.

DESCRIPTION OF EMBODIMENTS

For easy description of embodiments, the following first describes a NoC.

The NoC is a new on-chip communication architecture designed for a multi-core SoC. According to different NoC dimensions, the NoC is classified into a one-dimensional NoC, a two-dimensional NoC, and a multi-dimensional NoC. A dimension of the NoC is an arrangement direction of nodes in each ring network in the NoC. For example, when an arrangement of the nodes in each ring network in the NoC includes a horizontal direction and a vertical direction, the NoC is a two-dimensional NoC. The following uses the two-dimensional NoC as an example to describe a structure of the NoC.

Figure 1:
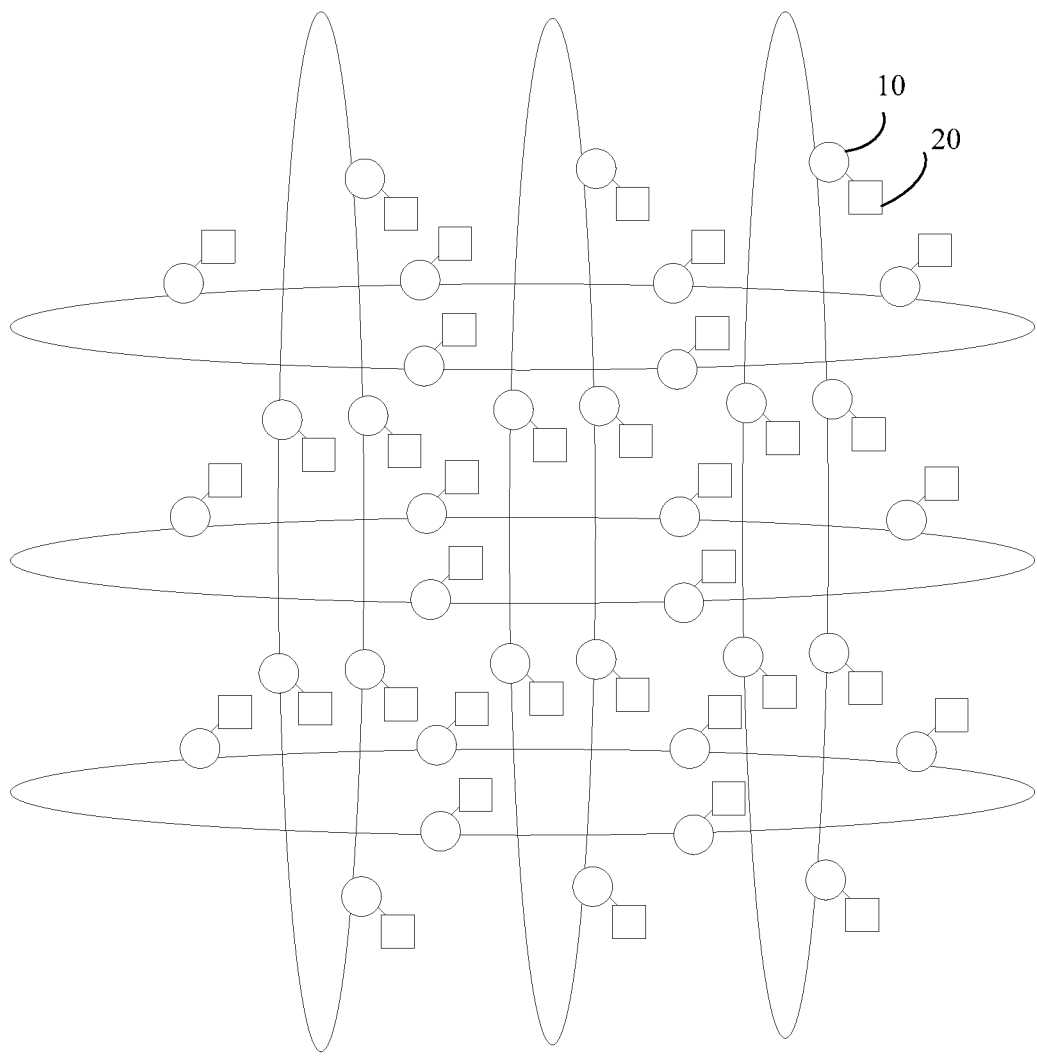
FIG. 1 is a schematic structural diagram of a network-on-chip according to an c of the present disclosure.

As shown in FIG. 1, a two-dimensional NoC includes two dimensions, which are recorded as a horizontal direction and a vertical direction. At least one ring network may be included in each dimension. Each ring network includes multiple routing nodes 10 (represented by a circle in FIG. 1), the multiple routing nodes 10 are connected in series into a ring shape, the multiple routing nodes 10 include at least one switching node, and each routing node 10 is configured to be connected to at least one function module 20 (for example, an IP core, and represented by a square in FIG. 1). Each ring network intersects with at least one other ring network. Two ring networks that intersect are in different dimensions, and one of the two ring networks that intersect is connected to a switching node in the other ring network by using a switching node, to exchange data. The two ring networks that intersect generally exchange data by using one pair of switching nodes, and the one pair of switching nodes is two connected switching nodes that are respectively located in the two ring networks that intersect. However, this is not limited in the embodiments of the present disclosure. The two ring networks that intersect may also exchange data by using two pairs of switching nodes. A data exchange means transmission of data in one ring network to another ring network.

The routing node 10 is a core component of the two-dimensional NoC and is responsible for data forwarding and transfer. Both a connection between each routing node 10 and an adjacent routing node 10 and a connection between each routing node 10 and a function module 20 are implemented by an input port and an output port. In a buffered two-dimensional ring, each input or output port generally includes multiple virtual channels (VC), and each VC includes a buffer. However, with the development of NoC technologies, to improve NoC performance, a two-dimensional ring without a virtual channel or a buffer, known as a bufferless NoC, is proposed. A ring network of the bufferless NoC is a bufferless ring network.

In the bufferless ring network, data transmission is performed by using a slot. The slot is a carrier that carries data. A number of slots in each ring network is equal to a number of routing nodes 10 in the ring network. A slot is transferred between the routing nodes 10 in the ring network according to a predetermined direction, and there is a slot at each routing node 10 at each moment in the ring network. When data is transmitted between the routing nodes 10 by using a slot, a routing node 10 may transmit data in the function module 20 to a slot, or may transmit data in a slot to the function module 20, and a switching node may transmit data in a slot of a ring network in which the switching node is located to a switching node that is in another ring network and that is connected to the switching node, or may obtain data of a switching node that is connected to the switching node and transmit the data in a ring network in which the switching node is located, so as to implement a data exchange between two ring networks.

Figure 2:
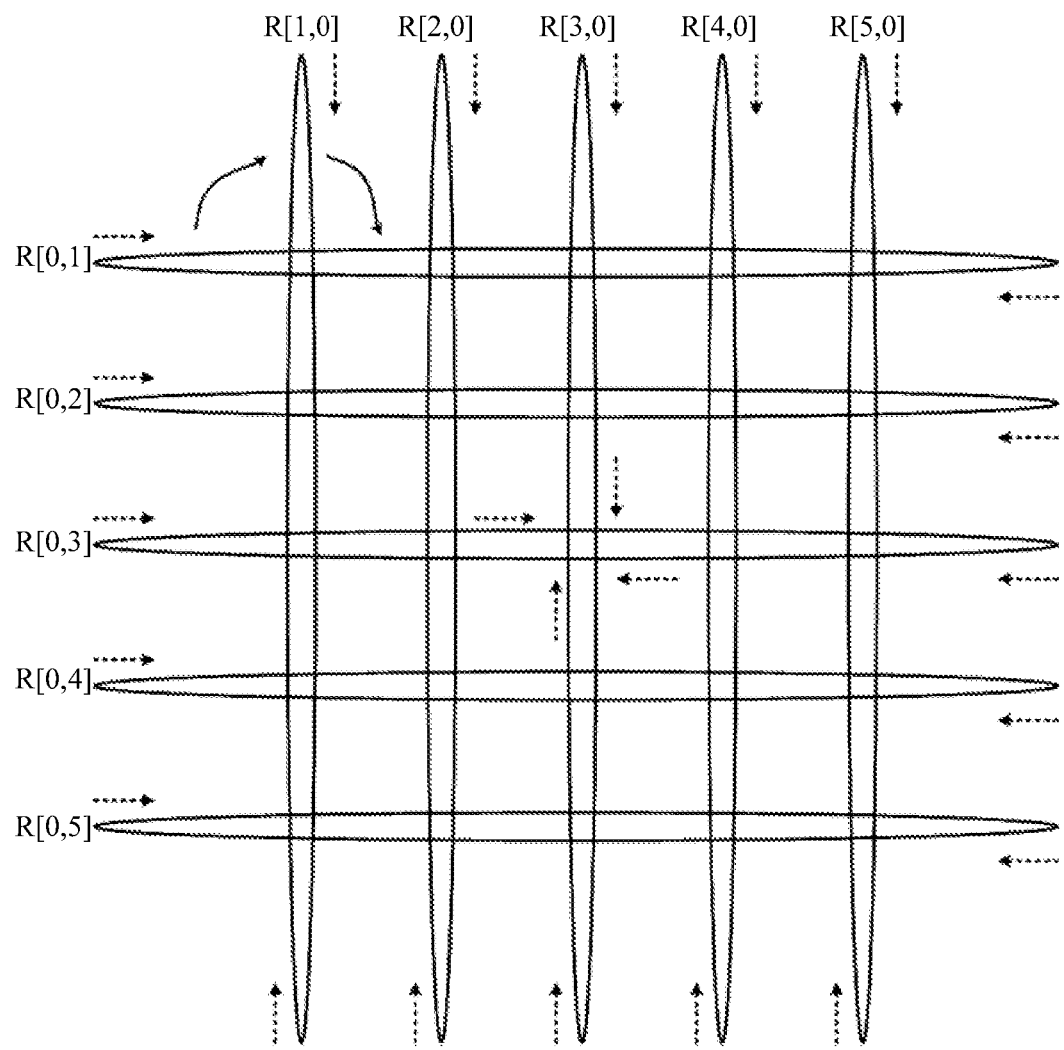
FIG. 2 is a schematic structural diagram of a network-on-chip according to an aspect of the present disclosure.
Figure 3:
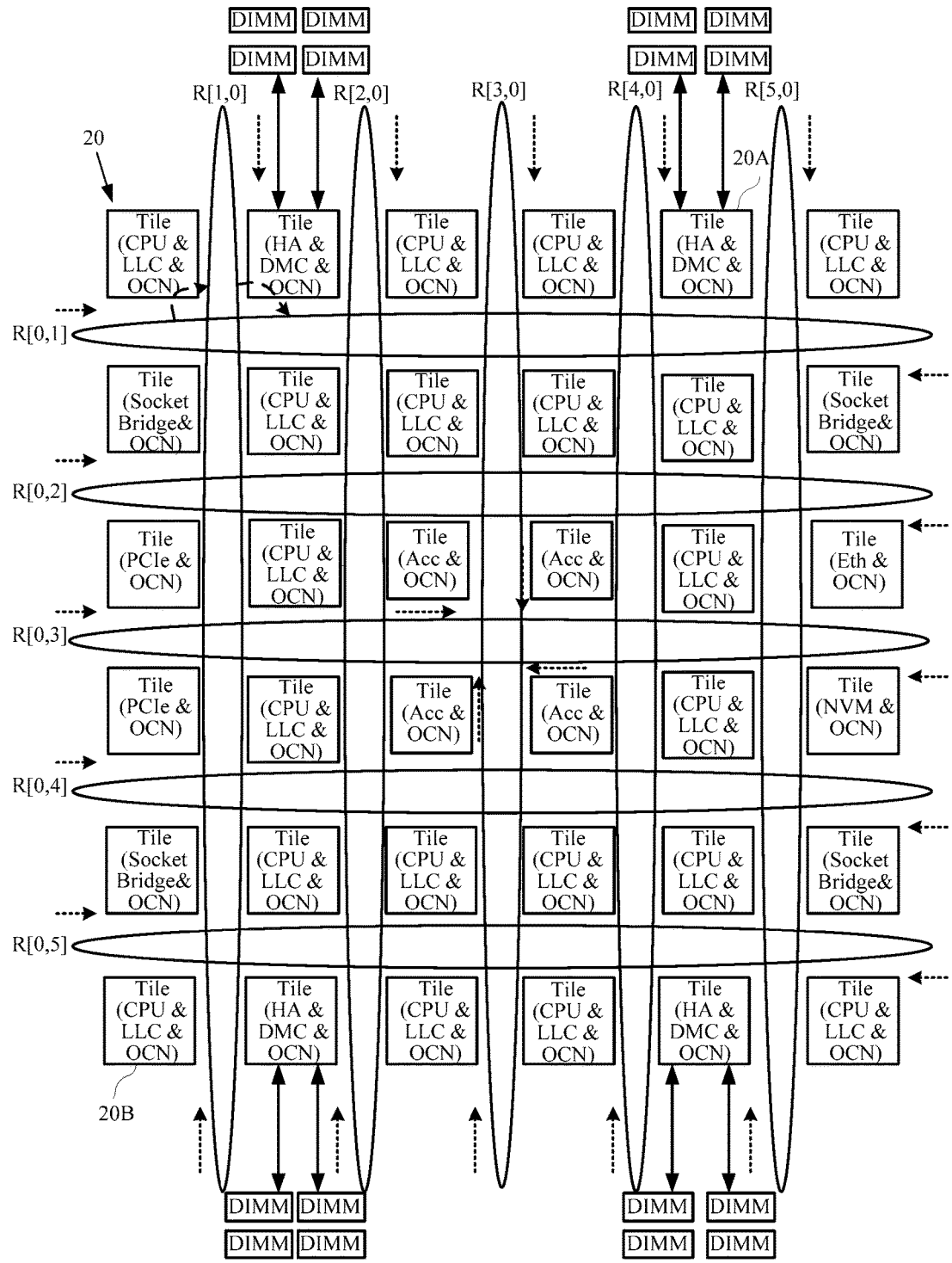
FIG. 3 is a schematic structural diagram of a network-on-chip according to an aspect of the present disclosure.

For the bufferless ring network, when receiving a slot, the switching node determines, according to a destination address, whether data in the slot is data to be transmitted to a function module 20 to which the switching node is connected. When the data in the slot is the data to be transmitted to the function module 20 to which the switching node is connected, the switching node transmits the data to the function module 20 by using an output port that is connected to the function module 20. When the data in the slot is not the data to be transmitted to the function module 20 to which the switching node is connected, the switching node determines a transmission direction according to the destination address, where the transmission direction includes continuing transmission in the local bufferless ring network or switching to another bufferless ring network for transmission. When the data needs to be switched to another bufferless ring network for transmission, the switching node needs to determine whether a slot at a switching node to which the switching node is connected is empty. When the slot is empty, the switching node transmits the data to the connected switching node. When the slot is not empty, the data cannot be switched to another bufferless ring network. In addition, because the switching node does not have a buffer, the switching node can only continue transmitting the data in the current bufferless ring network. Therefore, when all data in slots of one of two bufferless ring networks needs to be transmitted to the other bufferless ring network, and all data in slots of the other bufferless ring network needs to be transmitted to the bufferless ring network, when the slots of the two bufferless ring networks are not empty, a deadlock is generated. That is, data cannot be exchanged between the two bufferless ring networks. With reference to FIG. 2 and FIG. 3, the following further describes a cause of a deadlock that is generated between two bufferless ring networks.

FIG. 2 is a schematic structural diagram of a simplified NoC. For easy description, coordinates are set for each bufferless ring network. As shown in FIG. 2, in the NoC, when all destination routing nodes of data in a bufferless ring network R[0,1] are located in an R[1,0], and all destination routing nodes of data in the R[1,0] are located in the R[0,1], when neither of the two bufferless ring networks has an empty slot, the data in the two bufferless ring networks cannot be transferred to the other bufferless ring network. Consequently, a deadlock is formed.

FIG. 3 is a schematic diagram of a hardware structure of a NoC. The NoC is mainly applied to a SoC multi-core processor chip in a server or a communications base station. The high-end SoC multi-core processor chip generally includes a large number of processor cores (32 to 128 processor cores), a double rate synchronous dynamic random access memory (such as, Double Data Rate, DDR) controller module, a bus and interface standard (such as, Peripheral Component Interface Express (PCIE)) interconnection module, a network interconnection module, and the like. By means of design, a network-on-chip is used to connect the processor cores and the modules, and perform high-bandwidth and low-delay transfer of various data between the processor cores or the modules. The processor cores and the modules herein are the function modules 20 described above.

The processor core may be a tile (central processing unit (CPU) & last level cache (LLC) & network-on-chip interface (such as On-Chip Network (OCN) Interface)) shown in FIG. 3. The DDR controller module may be a tile (main memory consistency maintenance node (Home Agent, HA for short) & DDR memory controller (DMC) & OCN) shown in FIG. 3. The PCIE interconnection module may be a tile (PCIE & OCN)) shown in FIG. 3. The network interconnection module may be a tile (Ethernet (ETH for short) & OCN), a tile (accelerator (ACC for short) & OCN), or the like shown in FIG. 3.

As shown in FIG. 3, a function module 20A is connected to a dual in-line memory module (DIMM). A dynamic random access memory (DRAM) may be inserted on the DIMM. When a CPU and an LLC in a function module 20B need to access the DRAM to which the function module 20A is connected, data is first transmitted to a switching node between the R[1,0] and the R[0,1], then switched to the R[0,1] until the data is transmitted to a DMC. Communication between other nodes is similar. When two processor cores or modules in communication are not in a same horizontal or vertical bufferless ring network, data needs to be switched to another bufferless ring network in the middle of transmission. Correct transmission of the data requires a switch between bufferless ring networks, possibly causing an occurrence of a deadlock between the bufferless ring networks. Further referring to FIG. 3, it is assumed that all data transmitted on the vertical R[1,0] is data that needs to be written into the DRAM to which the function module 20A is connected, so the data requires a switch between bufferless ring networks to arrive at the horizontal R[0,1]. All data on the horizontal R[0,1] needs to be sent to the CPU processor in the function module 20B in the vertical R[1,0]. In this case, because neither of the two bufferless ring networks has an empty slot, data cannot be switched between them and can only constantly move in an original bufferless ring network, eventually causing a deadlock.

Figure 4:
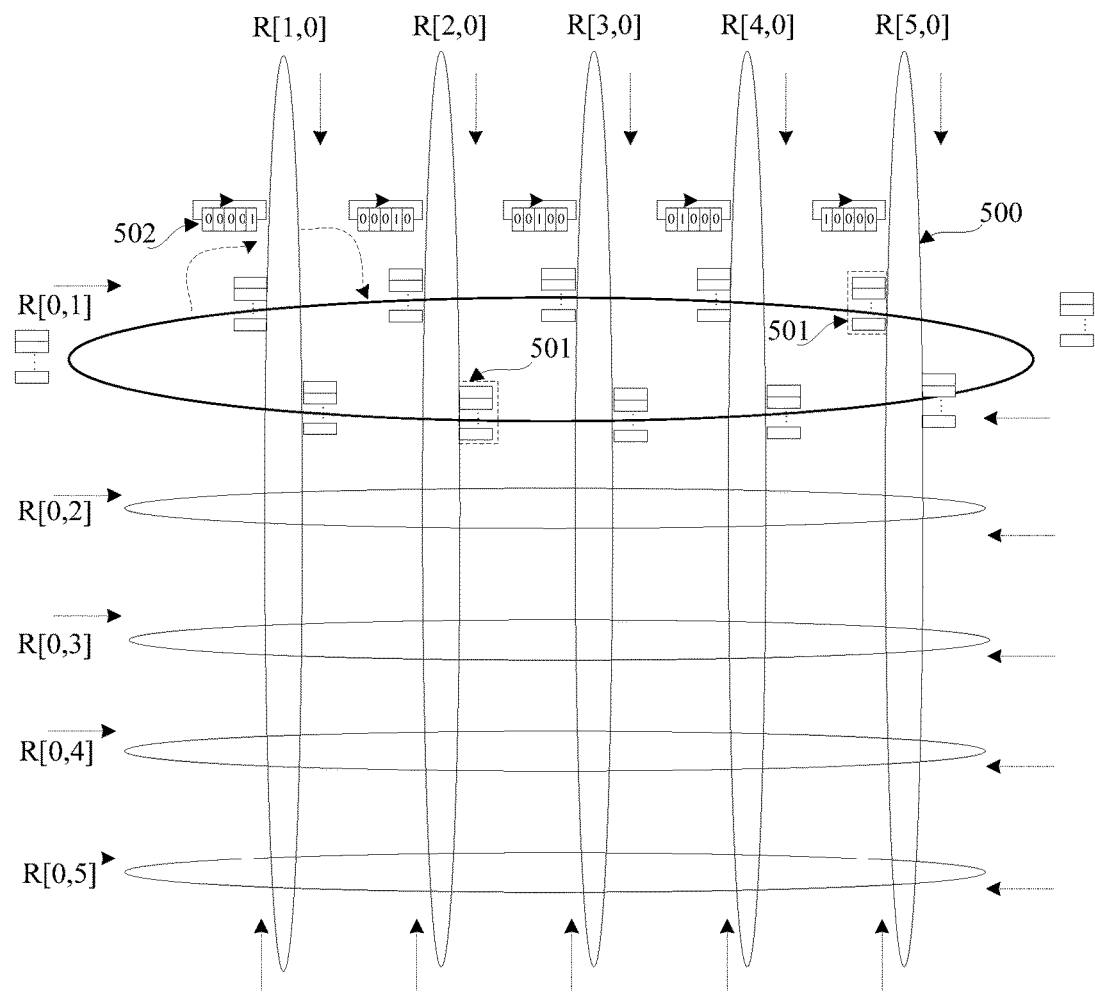
FIG. 4 is a schematic structural diagram of a network-on-chip according to an aspect of the present disclosure.
Figure 5:
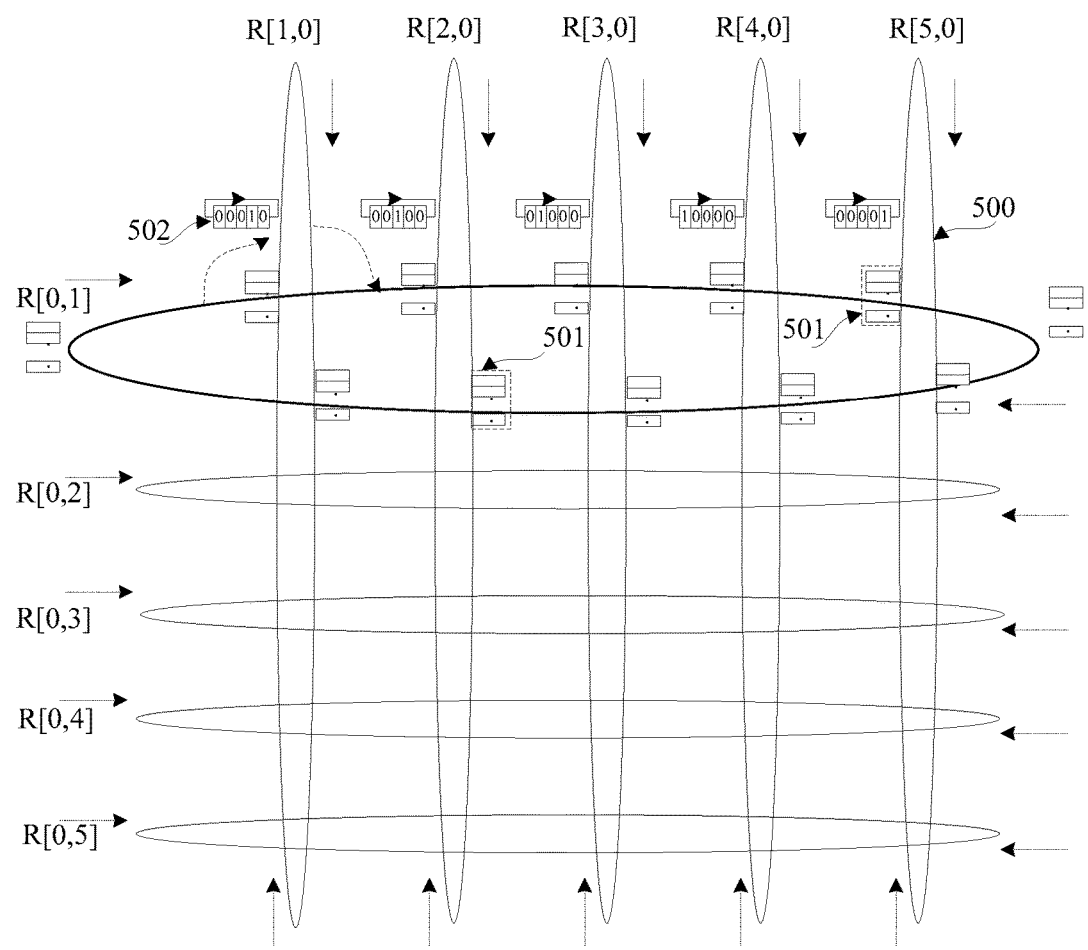
FIG. 5 is a schematic structural diagram of a network-on-chip according to an aspect of the present disclosure.

To resolve the foregoing problem, the present disclosure provides a network-on-chip. The network-on-chip is a two-dimensional network-on-chip or a multi-dimensional network-on-chip. With reference to FIG. 4 and FIG. 5, at least one bufferless ring network 500 is included in each dimension of the network-on-chip, each bufferless ring network includes multiple routing nodes, the multiple routing nodes are connected in series into a ring shape, each routing node is configured to be connected to at least one function module, and at least one of the multiple routing nodes is a switching node.

Each bufferless ring network intersects with at least one bufferless ring network, two bufferless ring networks that intersect are in different dimensions, and one of the two bufferless ring networks that intersect is connected to a switching node in the other bufferless ring network by using a switching node, to exchange data.

The following uses a first bufferless ring network and a second bufferless ring network as an example for description.

The network-on-chip includes the first bufferless ring network and the second bufferless ring network. The first bufferless ring network and the second bufferless ring network are any two bufferless ring networks (for example, an R[1,0] and an R[0,1]) that intersect in the network-on-chip. The first bufferless ring network and the second bufferless ring network are in different dimensions. The first bufferless ring network includes a first switching node, the second bufferless ring network includes a second switching node, and the first switching node and the second switching node are connected to each other to exchange data.

N slots 501 are configured in each bufferless ring network 500. Each slot 501 is cyclically transmitted in the bufferless ring network 500, and there is only one slot 501 at a routing node at a same moment. The slot 501 is used to carry data. N is a number of routing nodes in the bufferless ring network 500. The N slots 501 include M dedicated slots 501 and N−M public slots 501, where M and N are positive integers, and N>M≥1. Only one routing node has permission to use a dedicated slot 501 at a same moment in each bufferless ring network 500, the permission to use the dedicated slot 501 is transferred successively between switching nodes in each bufferless ring network 500, and the permission to use the dedicated slot 501 is transferred after transmission of data in the dedicated slot 501 is completed.

The first switching node is configured to: when the first switching node has permission to use a dedicated slot 501 of the first bufferless ring network, the dedicated slot 501 of the first bufferless ring network arrives at the first switching node, and the second switching node has data that needs to be transmitted to the first bufferless ring network, obtain the data of the second switching node, and use the dedicated slot 501 of the first bufferless ring network to transmit the obtained data.

Using the dedicated slot 501 to transmit the data includes transmitting the data to a destination routing node by using the dedicated slot 501.

In one or more embodiments of the present disclosure, the first switching node can use the dedicated slot 501 to transmit data in the first bufferless ring network, in addition to using the dedicated slot 501 to transmit data of the second switching node.

In one or more embodiments of the present disclosure, the dedicated slot is set in each bufferless ring network for data transmission. Only one switching node has the permission to use the dedicated slot at the same moment in each bufferless ring network, and the permission to use the dedicated slot is transferred successively between the switching nodes in each bufferless ring network. That is, the dedicated slot cannot be simultaneously used by two or more switching nodes, and a routing node that uses the dedicated slot needs to be a switching node. The dedicated slot can be used only when the switching node has the permission, and the permission to use the dedicated slot is transferred only after transmission of data in the dedicated slot is completed. This can ensure that when the switching node has the permission to use the dedicated slot, the dedicated slot is empty and can be used to transmit data. Therefore, when data in a bufferless ring network needs to be transmitted to another bufferless ring network by using a switching node, a problem that data cannot be exchanged does not occur, so as to avoid an occurrence of a deadlock between the two bufferless ring networks. In addition, the foregoing solution features low logic complexity and low resource consumption.

To describe an attribute of a slot, at least one of the slots 501 in each bufferless ring network includes a first identifier. For example, all or some of the slots 501 in each bufferless ring network include a first identifier. The first identifier may indicate whether the slot is a dedicated slot, or indicate a relative position relationship between a dedicated slot and the slot.

In an implementation, the first identifier is used to indicate whether a corresponding slot is a dedicated slot. In this implementation, the first identifier may be set only in the dedicated slot 501, to indicate that the slot is a dedicated slot.

In another implementation, the first identifier is used to indicate whether a next slot is a dedicated slot. The next slot is a slot that follows a current slot in a moving direction of the current slot. Indicating whether the next slot is a dedicated slot allows a switching node to know an arrival time of the dedicated slot in advance and prepare for data transmission. In this implementation, the first identifier may be set only in a slot that precedes the dedicated slot.

Certainly, in the foregoing two implementations, the first identifier may alternatively be set in each slot.

In one or more embodiments of the present disclosure, the first switching node includes a permission indicator 502, and the permission indicator 502 is configured to indicate whether the first switching node has the permission to use the dedicated slot 501. The permission to use the dedicated slot is assigned to multiple timeslots by setting the permission indicator 502, and different timeslots are allocated to different switching nodes, so as to implement time division multiplexing.

Further, at least one of the slots 501 in each bufferless ring network includes a second identifier, the second identifier is used to indicate whether to change a value of the permission indicator 502, and the first switching node is further configured to determine, according to a value of the second identifier, whether to change the value of the permission indicator 502. For example, when a value of a second identifier of a slot that is currently at the first switching node is a first value, the first switching node changes the value of the permission indicator 502; and when the value of the second identifier is a second value, the first switching node keeps the value of the permission indicator 502 unchanged. The value of the permission indicator 502 is used to indicate whether a switching node has the permission to use the dedicated slot 501.

The value of the permission indicator 502 constantly changes according to the value of the second identifier, and finally changes to a specified value, which indicates that the first switching node has the permission to use the dedicated slot 501.

Further, the first switching node is further configured to set the value of the second identifier when the first switching node has the permission to use the dedicated slot. Setting the value of the second identifier may include the following two implementations:

In a possible implementation, the first switching node is configured to: when the first switching node has the permission to use the dedicated slot, when any dedicated slot arrives at the first switching node for the first time after the first switching node obtains the permission to use the dedicated slot, set the value of the second identifier to the second value; and when any dedicated slot arrives at the first switching node not for the first time after the first switching node obtains the permission to use the dedicated slot, and the dedicated slot that arrives at the first switching node is empty, set the value of the second identifier to the first value. That is, when using the dedicated slot, the first switching node sets the value of the second identifier to the second value. In this process, the value of the permission indicator 502 of each switching node does not change. After using the dedicated slot, the first switching node sets the value of the second identifier to the first value, to allow the value of the permission indicator 502 of each switching node to be changed, so that the permission to use the dedicated slot is switched to another switching node.

In another possible implementation, the first switching node is configured to: when the first switching node has the permission to use the dedicated slot, when any dedicated slot arrives at the first switching node for the first time after the first switching node obtains the permission to use the dedicated slot, set the value of the second identifier to the second value; and when all dedicated slots have passed the first switching node for at least two times, and each dedicated slot is empty when passing the first switching node for the second time or later, set the value of the second identifier to the first value. That is, when using the dedicated slot, the first switching node sets the value of the second identifier to the second value, and after using all the dedicated slots, the first switching node sets a value of each second identifier to the first value.

The foregoing manners of setting the value of the second identifier are only examples. A manner of setting the value of the second identifier is not limited in this embodiment of the present disclosure.

In some embodiments of the present disclosure, at least one of the slots 501 in each bufferless ring network includes the second identifier. That is, the following several implementations are included. A first implementation is that only the dedicated slot includes the second identifier. A second implementation is that only the public slot includes the second identifier. For example, a public slot that follows a dedicated slot includes the second identifier. A third implementation is that both the public slot and the dedicated slot include the second identifier. Further, each slot may include the second identifier.

In the first implementation, the dedicated slot includes the second identifier, the second identifier is used to indicate whether to change the value of the permission indicator 502, and the first switching node may be configured to: when the dedicated slot is at the first switching node, determine, according to the value of the second identifier, whether to change the value of the permission indicator 502. Further, the first switching node may be further configured to: when the first switching node has the permission to use the dedicated slot, and the dedicated slot is at the first switching node, set the value of the second identifier. A setting manner may be the two implementations described above.

In the second implementation, the public slot includes the second identifier, the second identifier is used to indicate whether to change the value of the permission indicator 502, and the first switching node may be configured to: when a public slot that has the second identifier is at the first switching node, determine, according to the value of the second identifier, whether to change the value of the permission indicator 502. Further, the first switching node may be further configured to: when the first switching node has the permission to use the dedicated slot, and the public slot that has the second identifier is at the first switching node, set the value of the second identifier. A setting manner may be the two implementations described above.

In the third implementation, both the dedicated slot and the public slot include the second identifier, the second identifier is used to indicate whether to change the value of the permission indicator 502, and the first switching node may be configured to: when a slot that has the second identifier is at the first switching node, determine, according to the value of the second identifier, whether to change the value of the permission indicator 502. Further, the first switching node may be further configured to: when the first switching node has the permission to use the dedicated slot, and the slot that has the second identifier is at the first switching node, set the value of the second identifier. A setting manner may be the two implementations described above.

In this implementation of the present disclosure, the permission indicator 502 may be a shift register or a counter, and when a value of the shift register or the counter is a specified value, the first switching node has the permission to use the dedicated slot 501.

Schematic diagrams provided in FIG. 4 and FIG. 5 show that the permission indicator 502 is a shift register. Referring to FIG. 4 and FIG. 5, an R[0,1] includes a first to a fifth switching node, and the first to the fifth switching nodes are configured to exchange data with an R[5,0] to an R[1,0], respectively. As shown in FIG. 4 and FIG. 5, a value of a shift register of the first switching node is 10000. In this case, the first switching node has permission to use a dedicated slot. After using the dedicated slot, the first switching node sets a second identifier of the dedicated slot to the first value. When the dedicated slot is transmitted to the second switching node, a value of a shift register of the second switching node changes to 10000. In this case, the permission to use the dedicated slot is switched to the second switching node. Therefore, at this time, the second switching node may use the dedicated slot to transmit data to the R[0,1]. By analogy, the permission is gradually switched between switching nodes on the R[0,1], and finally switched back to the first switching node. By now, all bufferless ring networks that transmit data to the R[0,1] may send data to the R[0,1] when switching nodes of all the bufferless ring networks have the permission to use the dedicated slot. Similarly, a same mechanism is implemented in vertical bufferless ring networks R[1,0] to R[5,0], to ensure that horizontal R[0,1] to R[0,5] may transmit data to the vertical bufferless ring networks.

In some embodiments of the present disclosure, the first value of the second identifier may be 1, and the second value may be 0. When the second identifier is 1, the switching node at which the dedicated slot is may change the value of the permission indicator 502, for example, moving a value of a shift register by one bit, or adding 1 to a counter (the counter is reset when reaching the specified value). When the second identifier is 0, the switching node at which the dedicated slot is does not change the value of the permission indicator 502.

In an implementation of some embodiments of the present disclosure, the first switching node and the second switching node are directly connected, consuming less resources and power. When the first switching node and the second switching node are directly connected, the first switching node is further configured to: when the second switching node has permission to use a dedicated slot of the second bufferless ring network, the dedicated slot of the second bufferless ring network arrives at the second switching node, and the first switching node has data that needs to be transmitted to the second bufferless ring network, transmit the data to the second switching node.

The first switching node may determine, according to indication information sent by the second switching node, whether the second switching node has the permission to use the dedicated slot of the second bufferless ring network and whether the dedicated slot of the second bufferless ring network arrives at the second switching node. The indication information is used to indicate whether a switching node has permission to use a dedicated slot of a bufferless ring network in which the switching node is located, and whether the dedicated slot of the bufferless ring network in which the switching node is located arrives at the switching node.

The first switching node is further configured to send indication information to the second switching node according to whether the first switching node has the permission to use the dedicated slot of the first bufferless ring network and whether the dedicated slot of the first bufferless ring network arrives at the first switching node.

Further, when the first switching node and the second switching node are directly connected, to avoid that a dedicated slot of a bufferless ring network can exchange data only with a few slots in another bufferless ring network, a number of routing nodes in the first bufferless ring network 500 and a number of routing nodes in the second bufferless ring network 500 are not equal.

In another implementation of some embodiments of the present disclosure, a data exchange buffer is further disposed between the first switching node and the second switching node, and is configured to store data that needs to be transmitted from the first switching node to the second bufferless ring network, or store data that needs to be transmitted from the second switching node to the first bufferless ring network. For example, after leaving a bufferless ring network, data enters a data exchange buffer, and is sent to a destination bufferless ring network only after the destination bufferless ring network has an empty slot. In addition, the data exchange buffer uses a backpressure signal to notify the bufferless ring network of whether the bufferless ring network can continue writing data into the data exchange buffer. In this implementation, with design of the data exchange buffer, network performance can be improved, and a number of phenomena that data moves in a ring network circle by circle is reduced.

The data exchange buffer may be designed in a switching node. For example, the data exchange buffer may be designed in the first switching node, or in the second switching node, or in both the first switching node and the second switching node.

Further, the slot may further include an identifier that is used to indicate whether the slot is empty. A switching node can use a dedicated slot to transmit data only when the dedicated slot is empty. In this embodiment, when the slot does not carry data, the slot is empty; when the slot carries data, the slot is not empty.

With reference to a specific hardware structure, the following describes a first switching node provided by one or more embodiments of the present disclosure.

FIG. 6 shows a hardware structure of a first switching node 120 according to an aspect of the present disclosure. The first switching node 120 may include an input port 21, an output port 22, and a control logic circuit 23.

The control logic circuit 23 includes at least a first logic circuit 230 that is configured to determine permission to use a dedicated slot, a second logic circuit 231 that is configured to determine a position of the dedicated slot, and a third logic circuit 232 that is configured to control data transmission. The first logic circuit 230 is configured to determine whether the first switching node has permission to use a dedicated slot of a first bufferless ring network in which the first switching node is located. The second logic circuit 231 is configured to determine whether the dedicated slot arrives at the first switching node. The third logic circuit 232 is configured to: when the first switching node has the permission to use the dedicated slot of the first bufferless ring network, the dedicated slot of the first bufferless ring network arrives at the first switching node, and a switching node that is connected to the first switching node has data that needs to be transmitted to the first bufferless ring network, obtain the data of the switching node, and use the dedicated slot of the first bufferless ring network to transmit the obtained data.

Optionally, the foregoing logic circuits are configured to implement steps that need to be performed by the first switching node and that are shown in FIG. 7.

In addition, the control logic circuit 23 may be implemented by multiple combinations of logic circuits, for example, a shift register, a counter, a logic gate circuit, or the like.

A person skilled in the art may understand that the structure of the first switching node 120 shown in FIG. 6 does not constitute any limitation on the first switching node, and may include components more or fewer than those shown in the figure, or a combination of some components, or the components disposed differently.

Referring to FIG. 7, FIG. 7 shows another data transmission method according to an aspect of the present disclosure. The method is executed by the first switching node 120 shown in FIG. 6 and includes the following steps.

S201: A first switching node determines whether the first switching node has permission to use a dedicated slot of a first bufferless ring network in which the first switching node is located.

Step 201 may include:

determining, by the first switching node according to a permission indicator of the first switching node, whether the first switching node has the permission to use the dedicated slot, where the permission indicator is configured to indicate whether the first switching node has the permission to use the dedicated slot.

In some embodiments of the present disclosure, the first switching node determines, according to a value of the permission indicator, whether the first switching node has the permission to use the dedicated slot. When the value of the permission indicator is a specified value, the first switching node has the permission to use the dedicated slot; when the value of the permission indicator is not the specified value, the first switching node does not have the permission to use the dedicated slot.

Optionally, the dedicated slot includes a second identifier, and the method may further include:

determining, by the first switching node according to a value of the second identifier, whether to change the value of the permission indicator, where at least one of the slots in each bufferless ring network includes the second identifier, and the second identifier is used to indicate whether to change the value of the permission indicator. For example, when a value of a second identifier of a slot that is at the first switching node is a first value, the first switching node changes the value of the permission indicator; and when the value of the second identifier is a second value, the first switching node keeps the value of the permission indicator unchanged. The value of the permission indicator is used to indicate whether a switching node has the permission to use the dedicated slot.

Further, the method may further include:

when the first switching node has the permission to use the dedicated slot, setting the value of the second identifier.

S202: The first switching node determines whether the dedicated slot arrives at the first switching node.

In some embodiments of the present disclosure, at least one of the slots in the bufferless ring network includes a first identifier, and the first identifier is used to indicate whether a slot is a dedicated slot, or indicate a relative position relationship between a dedicated slot and the slot.

The first switching node determines, according to the first identifier, whether the dedicated slot arrives at the first switching node.

In an implementation, the first identifier is used to indicate whether a corresponding slot is a dedicated slot. In this implementation, the first identifier may be set only in the dedicated slot, to indicate that the slot is a dedicated slot.

In another implementation, the first identifier is used to indicate whether a next slot is a dedicated slot. The next slot is a slot that follows a current slot in a moving direction of the current slot. Indicating whether the next slot is a dedicated slot allows a switching node to know an arrival time of the dedicated slot in advance and prepare for data transmission. In this implementation, the first identifier may be set only in a slot that precedes the dedicated slot.

Certainly, in the foregoing two implementations, the first identifier may alternatively be set in each slot.

S203: When the first switching node has the permission to use the dedicated slot, and the dedicated slot arrives at the first switching node, the first switching node uses the dedicated slot to transmit data.

During implementation, step S203 includes: when the first switching node has the permission to use the dedicated slot of the first bufferless ring network, the dedicated slot of the first bufferless ring network arrives at the first switching node, and a second switching node that is in a second bufferless ring network and that is connected to the first switching node has data that needs to be transmitted to the first bufferless ring network, obtaining, by the first switching node, the data of the second switching node; and using the dedicated slot of the first bufferless ring network for transmission. The first bufferless ring network and the second bufferless ring network are any two bufferless ring networks that intersect in a network-on-chip.

Further, the method may further include: when the first switching node has the permission to use the dedicated slot, and the dedicated slot arrives at the first switching node, determining whether the dedicated slot is empty. When the dedicated slot is empty, the first switching node uses the dedicated slot to transmit the data. When the dedicated slot is not empty, the first switching node does not use the dedicated slot to transmit the data.

The slot further includes an identifier that is used to indicate whether the slot is empty. The first switching node determines, according to the identifier, whether the dedicated slot is empty. In this method embodiment, step S203 is an optional step.

Further, the method may further include:

determining, by the first switching node, whether the second switching node has permission to use a dedicated slot of the second bufferless ring network;

determining, by the first switching node, whether the dedicated slot of the second bufferless ring network arrives at the second switching node; and when the second switching node has the permission to use the dedicated slot of the second bufferless ring network, the dedicated slot of the second bufferless ring network arrives at the second switching node, and the first switching node has data that needs to be transmitted to the second bufferless ring network, transmitting, by the first switching node, the data to the second switching node.

The first switching node may determine, according to indication information sent by the second switching node, whether the second switching node has the permission to use the dedicated slot of the second bufferless ring network and whether the dedicated slot of the second bufferless ring network arrives at the second switching node. The indication information is used to indicate whether a switching node has permission to use a dedicated slot of a bufferless ring network in which the switching node is located, and whether the dedicated slot of the bufferless ring network in which the switching node is located arrives at the switching node.

The following is an apparatus example of the embodiments of the present disclosure. For details that are not described in the apparatus embodiment, reference may be made to the foregoing corresponding method embodiments.

Figure 8:
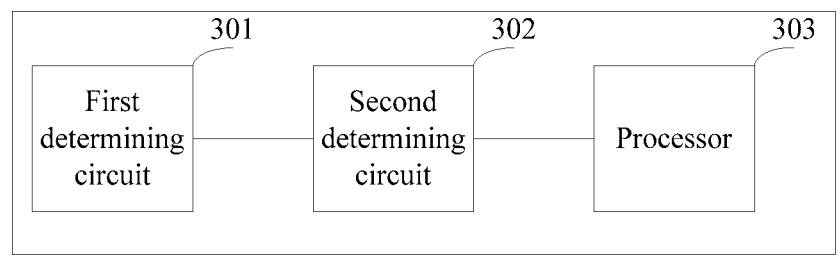
FIG. 8 is a schematic structural diagram of a communications apparatus according to an aspect of the present disclosure.

FIG. 8 shows a block diagram of a communications apparatus according to an aspect of the present disclosure. The communications apparatus may become all or some of a first switching node by using a dedicated hardware circuit or by using a combination of software and hardware. The first switching node includes a first determining circuit 301, a second determining circuit 302, and a processor 303. The first determining circuit 301 is configured to determine whether the first switching node has permission to use a dedicated slot of a first bufferless ring network in which the first switching node is located. The second determining circuit 302 is configured to determine whether the dedicated slot arrives at the first switching node. The processor 303 is configured to: when the first switching node has the permission to use the dedicated slot of the first bufferless ring network, the dedicated slot of the first bufferless ring network arrives at the first switching node, and a second switching node that is in a second bufferless ring network and that is connected to the first switching node has data that needs to be transmitted to the first bufferless ring network, obtain the data of the second switching node, and use the dedicated slot of the first bufferless ring network for transmission.

In this aspect of the present disclosure, a slot may include a first identifier and a second identifier. For a manner of setting the first identifier and the second identifier, reference may be made to the method embodiment corresponding to FIG. 7.

In a possible embodiment, the first switching node may further include a permission indicator, and the permission indicator is configured to indicate whether the first switching node has the permission to use the dedicated slot.

In a possible embodiment, the first switching node further includes a permission controller, configured to determine, according to a value of the second identifier, whether to change a value of the permission indicator.

Further, the permission controller is further configured to set the value of the second identifier when the first switching node has the permission to use the dedicated slot.

Further, the first determining circuit 301, the second determining circuit 302, and the processor 303 are further configured to execute a procedure, corresponding to FIG. 7, for transmitting data to the second switching node.

For related details, reference may be made to the method embodiment shown in FIG. 7.

It should be noted that the foregoing first determining circuit 301, the second determining circuit 302, and the processor 303 may be built by using a logic circuit. Certainly, the first determining circuit 301, the second determining circuit 302, and the processor 303 may be implemented by using one or more processors, or may be implemented by a combination of hardware and software for executing a program instruction in a memory by the one or more processors.

The present disclosure provides a network-on-chip, where the network-on-chip is a two-dimensional network-on-chip or a multi-dimensional network-on-chip, at least one bufferless ring network is included in each dimension of the network-on-chip, each bufferless ring network includes multiple routing nodes, the multiple routing nodes in each bufferless ring network are connected in series into a ring shape, and at least one of the multiple routing nodes in each bufferless ring network is a switching node; the network-on-chip includes a first bufferless ring network and a second bufferless ring network, the first bufferless ring network and the second bufferless ring network are any two bufferless ring networks that intersect in the network-on-chip, the first bufferless ring network and the second bufferless ring network are in different dimensions, the first bufferless ring network includes a first switching node, the second bufferless ring network includes a second switching node, and the first switching node and the second switching node are connected to each other to exchange data; N slots used for carrying data are configured in each bufferless ring network, N is a number of routing nodes in the bufferless ring network, each slot is cyclically transmitted in the bufferless ring network to which the slot belongs, and there is only one slot at a routing node at a same moment, where the N slots include M dedicated slots and N−M public slots, M is a positive integer, and N>M≥1; only one switching node has permission to use a dedicated slot at a same moment in each bufferless ring network, the permission to use the dedicated slot is transferred successively between switching nodes in the bufferless ring network to which the dedicated slot belongs, and the permission to use the dedicated slot is transferred after transmission of data in the dedicated slot is completed; and the first switching node is configured to: when the first switching node has permission to use a dedicated slot of the first bufferless ring network, the dedicated slot of the first bufferless ring network arrives at the first switching node, and the second switching node has data that needs to be transmitted to the first bufferless ring network, obtain the data of the second switching node, and use the dedicated slot of the first bufferless ring network to transmit the obtained data.

In this aspect of the present disclosure, data transmission is implemented by setting the dedicated slot of each bufferless ring network. Only one switching node has the permission to use the dedicated slot at the same moment in each bufferless ring network, and the permission to use the dedicated slot is transferred successively between the switching nodes in each bufferless ring network. That is, the dedicated slot cannot be simultaneously used by two or more switching nodes, and a routing node that uses the dedicated slot needs to be a switching node. In addition, the dedicated slot can be used only when a switching node has the permission, and the permission to use the dedicated slot is transferred after transmission of data in the dedicated slot is completed. Therefore, it is ensured that when a switching node has the permission to use the dedicated slot, the dedicated slot is empty and can transmit data. Therefore, when data in a bufferless ring network needs to be transmitted to another bufferless ring network by using a switching node, a problem that data cannot be exchanged does not occur, so as to avoid an occurrence of a deadlock (hang-up) between the two bufferless ring networks. In addition, the foregoing solution features low logic complexity and low resource consumption.

With reference to the first aspect, in a first implementation of the first aspect, at least one of the slots in each bufferless ring network includes a first identifier. For example, all or some of the slots in each bufferless ring network include the first identifier, where the first identifier indicates whether the slot is a dedicated slot, or indicate a relative position relationship between a dedicated slot and the slot.

To describe an attribute of a slot, a corresponding flag bit is set when the slot is transmitted, for example, a flag bit that indicates whether a current slot is a dedicated slot. A switching node determines, according to the flag bit, whether the current slot is a dedicated slot.

With reference to the first aspect or the first implementation of the first aspect, in a second implementation of the first aspect, the first switching node includes a permission indicator, and the permission indicator is configured to indicate whether the first switching node has the permission to use the dedicated slot.

With reference to the second implementation of the first aspect, in a third implementation of the first aspect, at least one of the slots in each bufferless ring network includes a second identifier, the second identifier is used to indicate whether to change a value of the permission indicator, and the first switching node is further configured to determine, according to a value of the second identifier, whether to change the value of the permission indicator.

For example, when the value of the second identifier is a first value, the value of the permission indicator is changed; when the value of the second identifier is a second value, the value of the permission indicator is kept unchanged. The value of the permission indicator is used to indicate whether the switching node has the permission to use the dedicated slot.

The value of the permission indicator includes having the permission to use the dedicated slot and not having the permission to use the dedicated slot. When the value is not having the permission to use the dedicated slot, the value may be further classified into multiple states, gradually changes between the multiple states, and finally changes to a state in which the permission to use the dedicated slot is obtained.

The second identifier may use different manners to indicate whether the permission needs to be switched. For example, when the second identifier is equal to 1, it indicates that the permission needs to be switched; when the second identifier is equal to 0, it indicates that the permission does not need to be switched.

With reference to the third implementation of the first aspect, in a fourth implementation of the first aspect, the first switching node is further configured to set the value of the second identifier when the first switching node has the permission to use the dedicated slot.

By setting the second identifier, a change of the permission to use the dedicated slot is implemented.

With reference to the second implementation of the first aspect, in a fifth implementation of the first aspect, the permission indicator is a shift register or a counter, and when a value of the shift register or the counter is a specified value, the first switching node has the permission to use the dedicated slot.

Implementing the permission indicator by using the shift register or the counter is simple and convenient.

With reference to the first aspect or the first implementation of the first aspect, in a sixth implementation of the first aspect, the first switching node and the second switching node are directly connected.

With reference to the sixth implementation of the first aspect, in a seventh implementation of the first aspect, the first switching node is further configured to: when the second switching node has permission to use a dedicated slot of the second bufferless ring network, the dedicated slot of the second bufferless ring network arrives at the second switching node, and the first switching node has data that needs to be transmitted to the second bufferless ring network, transmit the data to the second switching node.

In this implementation, when the first switching node and the second switching node are directly connected, when transmitting the data to the second switching node, the first switching node needs to first determine whether the second switching node has the permission to use the dedicated slot and whether the dedicated slot is at the second switching node, to avoid that the data cannot be transmitted after being sent to the second switching node.

With reference to the sixth implementation of the first aspect, in an eighth implementation of the first aspect, a number of routing nodes in the first bufferless ring network and a number of routing nodes in the second bufferless ring network are not equal.

When the first switching node and the second switching node are directly connected, setting the number of the routing nodes in the first bufferless ring network and the number of the routing nodes in the second bufferless ring network to different values avoids a problem that the dedicated slot of the first bufferless ring network can exchange data with only a few particular slots of the second bufferless ring network.

With reference to the first aspect or the first implementation of the first aspect, in a ninth implementation of the first aspect, a data exchange buffer is further disposed between the first switching node and the second switching node, and is configured to store data that needs to be transmitted from the first switching node to the second bufferless ring network, or store data that needs to be transmitted from the second switching node to the first bufferless ring network.

The present disclosure provides a data transmission method. The method includes:

determining, by a first switching node, whether the first switching node has permission to use a dedicated slot of a first bufferless ring network in which the first switching node is located, where the first bufferless ring network includes multiple routing nodes, the multiple routing nodes in the first bufferless ring network are connected in series into a ring shape, at least one of the multiple routing nodes in the first bufferless ring network is a switching node, and the at least one switching node includes the first switching node; N slots used for carrying data are configured in the first bufferless ring network, N is a number of the routing nodes in the first bufferless ring network, each slot is cyclically transmitted in the first bufferless ring network, there is only one slot at a routing node at a same moment, the N slots include M dedicated slots and N−M public slots, M is a positive integer, and $N>M\geq 1$; and only one switching node has the permission to use the dedicated slot at a same moment in the first bufferless ring network, the permission to use the dedicated slot is transferred successively between switching nodes in the first bufferless ring network, and the permission to use the dedicated slot is transferred after transmission of data in the dedicated slot is completed;

determining, by the first switching node, whether the dedicated slot arrives at the first switching node; and when the first switching node has the permission to use the dedicated slot of the first bufferless ring network, the dedicated slot of the first bufferless ring network arrives at the first switching node, and a second switching node that is in a second bufferless ring network and that is connected to the first switching node has data that needs to be transmitted to the first bufferless ring network, obtaining, by the first switching node, the data of the second switching node, and using the dedicated slot of the first bufferless ring network for transmission, where the first bufferless ring network and the second bufferless ring network are any two bufferless ring networks that intersect in a network-on-chip, and the first bufferless ring network and the second bufferless ring network are in different dimensions.

With reference to the second aspect, in a first implementation of the second aspect, at least one of the slots in the bufferless ring network includes a first identifier, and the first identifier indicates whether the slot is a dedicated slot, or indicate a relative position relationship between a dedicated slot and the slot.

With reference to the first aspect or the first implementation of the first aspect, in a second implementation of the first aspect, the determining, by a first switching node, whether the first switching node has permission to use a dedicated slot of a first bufferless ring network in which the first switching node is located includes:

determining, by the first switching node according to a permission indicator of the first switching node, whether the first switching node has the permission to use the dedicated slot, where the permission indicator is configured to indicate whether the first switching node has the permission to use the dedicated slot.

With reference to the second implementation of the second aspect, in a third implementation of the second aspect, the method further includes:

determining, by the first switching node according to a value of a second identifier, whether to change a value of the permission indicator, where at least one of the slots in each bufferless ring network includes the second identifier, and the second identifier is used to indicate whether to change the value of the permission indicator.

With reference to the third implementation of the second aspect, in a fourth implementation of the first aspect, the method further includes:

when the first switching node has the permission to use the dedicated slot, setting, by the first switching node, the value of the second identifier.

With reference to the first aspect or the first implementation of the second aspect, in a fifth implementation of the first aspect, the method further includes:

determining, by the first switching node, whether the second switching node has permission to use a dedicated slot of the second bufferless ring network;

determining, by the first switching node, whether the dedicated slot of the second bufferless ring network arrives at the second switching node; and when the second switching node has the permission to use the dedicated slot of the second bufferless ring network, the dedicated slot of the second bufferless ring network arrives at the second switching node, and the first switching node has data that needs to be transmitted to the second bufferless ring network, transmitting, by the first switching node, the data to the second switching node.

The present disclosure provides a first switching node, where the first switching node includes units that are configured to implement the method according to the foregoing second aspect, for example, a first determining circuit, a second determining circuit, and a processor.

The foregoing descriptions are merely example embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A network-on-chip, comprising:
a two-dimensional network-on-chip, wherein at least one dimension of the network-on-chip comprises at least one bufferless ring network, wherein the at least one bufferless ring network comprises a plurality of routing nodes, wherein at least one routing node of the routing nodes is a switching node, wherein the network-on-chip comprises:
a first bufferless ring network comprising a first switching node, wherein the first switching node comprises a permission indicator, wherein the permission indicator comprises at least one of a shift register or a counter; and
a second bufferless ring network that intersects the first bufferless ring network, wherein the first bufferless ring network is in a different dimension than the second bufferless ring network, wherein the second bufferless ring network comprises a second switching node, wherein the first switching node is coupled to the second switching node to exchange data, and wherein each of the at least one bufferless ring networks comprises:
N slots configured to carry data;
N routing nodes, wherein each slot is cyclically transmitted in a bufferless ring network to which a slot belongs, and wherein each routing of the N routing nodes comprises only one slot at a same moment, wherein the N slots comprise M dedicated slots and N−M public slots, wherein M is a positive integer, wherein N>M≥1, wherein only one switching node has a permission to use a dedicated slot of the M dedicated slots at a same moment, wherein the permission to use the dedicated slot of the M dedicated slots is transferred between switching nodes in a bufferless ring network of the at least one bufferless ring network to which the dedicated slot belongs, and wherein the permission to use the dedicated slot is transferred after transmission of data in the dedicated slot is completed, and wherein the first switching node comprises the permission to use the dedicated slot when a value of at least one of the shift register or the counter is a specified value, wherein the first switching node is further configured to:
receive the dedicated slot at the first switching node when the first switching node has permission to use the dedicated slot of the first bufferless ring network;
obtain the data of the second switching node when the second switching node has data that needs to be transmitted to the first bufferless ring network; and
use the dedicated slot of the first bufferless ring network to transmit the obtained data.

2. The network-on-chip of claim 1, wherein at least one slot in each bufferless ring network of the at least one bufferless ring network comprises a first identifier, and wherein the first identifier either indicates whether the at least one slot is a dedicated slot or indicates a relative position relationship between a dedicated slot and the at least one slot.

3. The network-on-chip of claim 1, wherein the permission indicator indicates whether the first switching node has the permission to use the dedicated slot.

4. The network-on-chip of claim 3, wherein at least one slot in each bufferless ring network of the at least one bufferless ring network comprises a second identifier, wherein the second identifier indicates whether to change a value of the permission indicator, and wherein the first switching node is further configured to determine, according to a value of the second identifier, whether to change the value of the permission indicator.

5. The network-on-chip of claim 4, wherein the first switching node is further configured to set the value of the second identifier when the first switching node comprises the permission to use the dedicated slot.

6. The network-on-chip of claim 1, wherein the first switching node is directly coupled to the second switching node.

7. The network-on-chip of claim 6, wherein the second switching node is further configured to receive a second dedicated slot of the second bufferless ring network when the second switching node comprises a permission to use a dedicated slot of the second bufferless ring network, and wherein the first switching node is configured to transmit data to the second switching node when the first switching node includes the data that needs to be transmitted to the second bufferless ring network.

8. The network-on-chip of claim 6, wherein a first number of routing nodes in the first bufferless ring network are not equal to a second number of routing nodes in the second bufferless ring network.

9. The network-on-chip of claim 1, wherein a data exchange buffer is further disposed between the first switching node and the second switching node, and wherein the data exchange buffer is configured to either store data to be transmitted from the first switching node to the second bufferless ring network or store the data to be transmitted from the second switching node to the first bufferless ring network.

10. A data transmission method, comprising:
determining, by a first switching node, whether the first switching node comprises a permission to use a dedicated slot of a first bufferless ring network, wherein the first switching node is located in the first bufferless ring network, wherein the first bufferless ring network comprises a plurality of routing nodes, wherein the routing nodes are connected in series into a ring shape, wherein at least one of the routing nodes comprises a switching node, wherein the first bufferless ring network comprises N slots and N routing nodes, wherein the N slots are configured to carry data in the first bufferless ring network, wherein each of the N slots is cyclically transmitted in the first bufferless ring network, wherein there is only one slot at a routing node at a same moment, wherein the N slots comprise M dedicated slots and N−M public slots, wherein M is a positive integer and N>M≥1, wherein one switching node comprises a permission to use a dedicated slot at a same moment in the first bufferless ring network, wherein the permission to use the dedicated slot is transferred between switching nodes in the first bufferless ring network, and wherein the permission to use the dedicated slot is transferred after transmission of data in the dedicated slot is completed;
determining, by the first switching node, whether the dedicated slot is received at the first switching node;
setting, by the first switching node, a value of a second identifier based on the first switching node comprising the permission to use the dedicated slot, wherein the second identifier corresponds to the permission to use the dedicated slot;
receiving, by the first switching node, the dedicated slot of the first bufferless ring network based on the permission to use the dedicated slot;
obtaining, by the first switching node, data of a second switching node; and
using, by the first switching node, the dedicated slot for transmission, wherein the first bufferless ring network and the second bufferless ring network intersect in a network-on-chip, and wherein the first bufferless ring network is in a different dimension than the second bufferless ring network.

11. The method of claim 10, wherein at least one of the N slots comprises the first identifier, and wherein the first identifier either indicates whether the at least one slot is a dedicated slot or indicates a relative position relationship between a dedicated slot and the slot.

12. The method of claim 10, wherein determining whether the first switching node comprises a permission to use the dedicated slot of a first bufferless ring network comprises determining, according to a permission indicator of the first switching node, whether the first switching node comprises the permission to use the dedicated slot, wherein the permission indicator indicates whether the first switching node comprises the permission to use the dedicated slot.

13. The method of claim 12, wherein the method further comprises determining, according to the value of the second identifier, whether to change a value of the permission indicator, wherein at least one slot in each bufferless ring network comprises the second identifier, and wherein the second identifier indicates whether to change the value of the permission indicator.

14. The method of claim 10, further comprising:
determining whether the second switching node comprises a permission to use a second dedicated slot of the second bufferless ring network;
determining whether the dedicated slot of the second bufferless ring network arrives at the second switching node; and
transmitting the data to the second switching node when:
the second switching node comprises the permission to use the second dedicated slot;
the second dedicated slot arrives at the second switching node; and
the first switching node comprises the data that needs to be transmitted to the second bufferless ring network.

15. A first switching node, comprising:
a first determining circuit configured to determine whether the first switching node comprises a permission to use a dedicated slot, wherein the first switching node is located in a first bufferless ring network comprising a plurality of routing nodes, wherein the routing nodes are connected in series into a ring shape, wherein at least one routing node of the routing nodes is the first switching node, wherein N slots carry data in the first bufferless ring network, wherein N comprises a number of the routing nodes, wherein each of the N slots is cyclically transmitted in the first bufferless ring network, wherein only one slot is present at a routing node of the routing nodes at a same moment, wherein the N slots comprise M dedicated slots and N−M public slots, wherein M is a positive integer, and wherein N>M≥1, wherein only one switching node in the first bufferless ring network comprises the permission to use the dedicated slot at a same moment, wherein the permission is transferred between switching nodes in the first bufferless ring network, and wherein the permission to use the dedicated slot is transferred after transmission of data in the dedicated slot is completed, wherein at least one of the N slots in the first bufferless ring network comprises a second identifier, wherein the second identifier indicates whether to change a value of a permission indicator that indicates a permission for a dedicated slot, and wherein the switching node comprises the permission indicator;
a second determining circuit coupled to the first determining circuit, wherein the second determining circuit is configured to determine whether the dedicated slot arrives at the first switching node; and
a processor, configured to:
receive the dedicated slot of the first bufferless ring network at the first switching node when the first switching node comprises the permission to use the dedicated slot of the first bufferless ring network;
obtain the data of a second switching node in a second bufferless ring network when the second switching node comprises data that needs to be transmitted to the first bufferless ring network, wherein the second switching node is coupled to the first switching node; and
use the dedicated slot of the first bufferless ring network for transmission, wherein the first bufferless ring network and the second bufferless ring network are any two bufferless ring networks that intersect in a network-on-chip, and wherein the first bufferless ring network is in a different dimension than the second bufferless ring network.

16. The first switching node of claim 15, wherein at least one of the slots in the bufferless ring network comprises a first identifier, and wherein the first identifier either indicates whether the slot is a dedicated slot or indicates a relative position relationship between a dedicated slot and the slot.

17. The first switching node of claim 16, wherein the first switching node comprises the permission indicator the permission indicator is configured to indicate whether the first switching node has the permission to use the dedicated slot.

18. The first switching node of claim 17, wherein the permission controller is further configured to set the value of the second identifier when the first switching node comprises the permission to use the dedicated slot.

19. The first switching node of claim 15, wherein the first determining circuit is further configured to determine whether the second switching node comprises a permission to use a second dedicated slot of the second bufferless ring network, wherein the second determining circuit is further configured to determine whether the second dedicated slot arrives at the second switching node and wherein the processor is further configured to transmit the data to the second switching node when the first switching node comprises data that needs to be transmitted to the second bufferless ring network.

* * * * *